United States Patent
Zhang

(10) Patent No.: US 12,510,170 B2
(45) Date of Patent: Dec. 30, 2025

(54) DIAPHRAGM SWITCH VALVE AND ASSEMBLY METHOD FOR SAME

(71) Applicant: KOSCN Industrial Manufacturing (Shenzhen) Co., Ltd., Guangdong (CN)

(72) Inventor: Shengzhou Zhang, Guangdong (CN)

(73) Assignee: KOSCN Industrial Manufacturing (Shenzhen) Co., Ltd., Guangdong (CN)

( * ) Notice: Subject to any disclaimer, the term of this patent is extended or adjusted under 35 U.S.C. 154(b) by 0 days.

(21) Appl. No.: 18/432,432

(22) Filed: Feb. 5, 2024

(65) Prior Publication Data

US 2024/0280180 A1 Aug. 22, 2024

(30) Foreign Application Priority Data

Feb. 22, 2023 (CN) .......................... 202310187306.1

(51) Int. Cl.
*F16K 7/16* (2006.01)

(52) U.S. Cl.
CPC ..................... *F16K 7/16* (2013.01)

(58) Field of Classification Search
CPC .......... F16K 7/16; F16K 7/17; F16K 27/0236; F16K 31/504
See application file for complete search history.

(56) References Cited

U.S. PATENT DOCUMENTS

| | | | |
|---|---|---|---|
| 5,112,027 A | 5/1992 | Hanyu et al. | |
| 5,407,173 A * | 4/1995 | Smith | F16K 1/14 251/86 |
| 6,000,416 A * | 12/1999 | Kingsford | F16K 41/103 251/63.5 |
| 6,202,683 B1 | 3/2001 | Smith | |
| 8,087,641 B2 * | 1/2012 | Masamura | F16K 31/122 251/367 |

(Continued)

FOREIGN PATENT DOCUMENTS

| | | | |
|---|---|---|---|
| CN | 101097000 A * | 1/2008 | .............. F16K 1/38 |
| CN | 101349355 A | 1/2009 | |
| CN | 103502708 A | 1/2014 | |

(Continued)

OTHER PUBLICATIONS

Machine English translation of CN_101097000_A (Year: 2025).*

(Continued)

*Primary Examiner* — Hailey K. Do
(74) *Attorney, Agent, or Firm* — Cooper Legal Group, LLC

(57) ABSTRACT

A diaphragm switch valve and a method for assembling same, the diaphragm switch valve includes a valve seat having two transverse fluid passages, and a valve body for disconnecting a the two fluid passages by a valve diaphragm and providing an axially collapsible elastic force to the valve diaphragm by an elastic driving structure. The first fluid passage is bent upwards in the valve seat to form a central fluid passage port toward a central axis of valve and toward a lifting diaphragm core corresponding to the valve diaphragm the second fluid passage forms, in the valve seat, a surrounding fluid passage port surrounding the central fluid passage port toward a diaphragm flexure of the valve diaphragm; the valve seat or the lifting diaphragm core has a annular knife-edge respective on the central fluid passage port and the surrounding fluid passage port.

11 Claims, 13 Drawing Sheets

(56) References Cited

U.S. PATENT DOCUMENTS

| | | | | |
|---|---|---|---|---|
| 8,353,498 | B2* | 1/2013 | Fukano | F16K 31/60 251/80 |
| 11,408,537 | B2* | 8/2022 | Doi | F16K 31/1221 |

FOREIGN PATENT DOCUMENTS

| CN | 105387219 | A | | 3/2016 | | |
|---|---|---|---|---|---|---|
| CN | 108884945 | A | | 11/2018 | | |
| WO | WO-2012147775 | A1 | * | 11/2012 | ....... | F16K 31/52491 |
| WO | WO-2020021836 | A1 | * | 1/2020 | ........... | F16K 27/029 |

OTHER PUBLICATIONS

Machine English translation of WO_2012147775_A1 (Year: 2025).*
Machine English translation of WO_2020021836_A1 (Year: 2025).*
First Office Action received in corresponding Chinese patent application No. 202310187306.1, dated Dec. 20, 2024, 13 pages.
Second Office Action received in corresponding Chinese patent application No. 202310187306.1, dated Dec. 31, 2024, 15 pages.

* cited by examiner

DIAPHRAGM SWITCH VALVE AND ASSEMBLY METHOD FOR SAME

CROSS-REFERENCE TO RELATED APPLICATION

This application claims the priority to Chinese patent application serial no. 202310187306.1, filed on Feb. 22, 2023. The entirety of Chinese patent application serial no. 202310187306.1 is hereby incorporated by reference herein and made a part of this specification.

TECHNICAL FIELD

The present disclosure relates to the technical field of diaphragm valves, and more particularly, to a diaphragm switch valve and an assembly method for the same, which is configured for treating chemicals in semiconductor process or medicament.

BACKGROUND ART

The existing diaphragm valves are mainly divided into diaphragm pressure relief valves and diaphragm switch valves. The diaphragm pressure relief valve is configured to reduce fluid pressure, and the diaphragm switch valve is used to connect and disconnect fluid flow. The technical development demand of the diaphragm switch valve is not only to fully close the valve with zero leakage in the early stage of use, but also to fully close the valve with zero leakage after many switching operations for a long time, which is different from the purpose of the diaphragm pressure relief valve, which is configured to be slightly opened to reduce pressure. The drive mode of the diaphragm switch valve can be roughly divided into pneumatic drive and manual drive. A manual diaphragm control valve is to adjust the opening degree to achieve the flow regulation, its designed opening degree is relatively linear, and therefore the regulation is relatively accurate.

With the continued development of technology, it would be desirable to provide a diaphragm switch valve that can be simultaneously used for many operations of switching and regulation, particularly in the supply of medical fluids and processing fluids for semiconductor processing. The current demand of the industry for diaphragm switch valves is that the diaphragm switch valve can still avoid fluid leakage even after adjusting the fluid switches for millions of times.

Patent publication No. CN108884945A discloses a diaphragm valve which can be fully closed, which is one of diaphragm switch valves. The diaphragm valve is integrated with a plunger having a fluid passage in its axial center. The plunger is connected to a hub coupled to the diaphragm, the hub further comprises a fluid passage, and the plunger is in fluid communication with the fluid passage of the hub, that is, it is related to a switch that pneumatically/hydraulically drives the diaphragm. The fluid passage in the hub extends through the back side of the diaphragm in a valve cavity and allows for substantially complete pressurization or evacuation of the volume behind the diaphragm in the valve. With the substantially complete pressurization of the volume behind the diaphragm, a full closing of the diaphragm can be achieved, and the contact of the diaphragm with the valve seat can be improved. However, the inlet passage may exert fluid thrust while the outlet passage may exert fluid suction on the valve diaphragm. When the total force on the valve diaphragm from the inlet passage and the outlet passage is eccentric, more valve diaphragm closing force is required, which may damage the service life of the valve diaphragm. In the existing technique, the outlet passage is configured at a center of a valve shaft, the inlet passage is eccentrically configured relative to the valve, and the outlet passage extends parallel to the inlet passage as well as to the switch direction of the valve. However, in the relevant existing technique, the technical inspiration that the diaphragm valve can be fully closed is the close attachment of the valve diaphragm over a large area.

Patent publication No. CN103502708A discloses a diaphragm valve, in particular for a fluid medium, having a valve body, a diaphragm and a connector which can be operated by a drive device and which is configured to apply a load to the diaphragm, in particular, the valve body and the diaphragm are made of plastic, and two mechanical sealing devices are provided which are independent of each other and is configured for sealing from outside. Not only the valve body and the diaphragm are welded to each other but also the diaphragm is mechanically sealed between the drive device or an intermediate piece and the valve body. The diaphragm valve is a disposable device, in particular, there are a groove and a spring seal on the radial inner side the welded sealing device. However, in the related art the inlet passage and the outlet passage are eccentrically on two opposite sides of the valve, respectively. Based on the force analysis of the valve diaphragm, the total resultant force on the valve diaphragm is still eccentric under the pressurization force from the inlet passage and the decompression force from the outlet passage. In order to close the valve, the disposable structure formed by reinforced welding and strengthened fixed connection of the valve diaphragm is inevitable. However, in the related art, the technical inspiration for closing the diaphragm valve is that the intermediate portion of the valve diaphragm abuts against the valve seat, so as to isolate and close the two eccentric fluid passages.

In the semiconductor and medicine field, there are more stringent requirements for diaphragm switch valves, which shall not only be configured for regulating the switching operation of the fluid, such that the diaphragm switch valve can be closed tightly after it is opened and closed many times, but also be configured to reduce the precipitation of medicament micro-particles or ions in the semiconductor/medicine field. However, it is generally known in the art that in order to achieve a more tightly closure of a diaphragm valve, a large closure contact area of valve diaphragm with valve seat of a diaphragm valve is required, which causes that insoluble or crystalline micro-particles or ions in a medicament in the semiconductor/medicine field is more easily clamped between the contact faces when closing the valve diaphragm and the valve seat, and therefore the problem of micro-particle/ion precipitation in a medicament in the semiconductor/medical field cannot be avoided.

SUMMARY

The present disclosure is to provide a diaphragm switch valve, by which the problem of easy precipitation of micro-particles/ions in a medicament caused by the enlarged abutment area of the valve diaphragm for complete seal in the traditional diaphragm switch valve can be avoided, and by which the quantity of durable operations for regulating the fluid switch can be increased. It is possible for the present diaphragm switch valve to be switched on and off for no less than one million times with zero leakage and no particle and ion precipitation.

The present disclosure is further to provide an assembly method for a diaphragm switch valve, to manufacture a diaphragm switch valve having the above-described effects.

The diaphragm switch valve provided adopts the following technical solutions.

A diaphragm switch valve is provided, including:
- a valve seat configured with a first fluid passage and a second fluid passage transverse to a liquid inlet and a liquid outlet, and
- a valve body provided on the valve seat, the valve body comprises a valve diaphragm, an elastic driving structure configured for driving the valve diaphragm to ascend and descend along a central axis of valve to open and close the diaphragm switch valve, and a valve housing configured to provide an accommodation space for the valve diaphragm to ascend and be connected to the elastic driving structure, the valve diaphragm is configured to disconnect the first fluid passage and the second fluid passage,
- wherein the valve diaphragm has a lifting diaphragm core concentric with the central axis of valve, a fixed diaphragm ring which is limited, and a diaphragm flexure configured for flexibly connecting the lifting diaphragm core and the fixed diaphragm ring,
- wherein the first fluid passage is bent upward in the valve seat to form a central fluid passage port, the central fluid passage port extends concentrically with the central axis of valve, the central fluid passage port is directed to the lifting diaphragm core, the second fluid passage forms a surrounding fluid passage port surrounding the central fluid passage port, and the surrounding fluid passage port is directed to the diaphragm flexure,
- wherein an inner pipe edge of the valve seat between the central fluid passage port and the surrounding fluid passage port is provided with an annular knife-edge, the annular knife-edge is configured to contact the lifting diaphragm core of the valve diaphragm when the valve body is closed; or the lifting diaphragm core is provided with an annular knife-edge configured to contact the inner pipe edge of the valve seat between the central fluid passage port and the surrounding fluid passage port when the valve body is closed, and
- when the valve body is closed, a pressure center point of the lifting diaphragm core is located on the central axis of valve.

In the present embodiment, when the valve body is closed, the pressure center point of the lifting diaphragm core is located on the central axis of valve by means of the elastic closing force provided by the switch structure of the valve body, which is coaxial and concentric with the fluid, in combination with the valve body. The contact area by the closed valve body between the valve diaphragm and the valve seat only lies in a region of the lifting diaphragm core corresponding to the annular knife-edge, the pressure for connecting and disconnecting the fluid flow of the diaphragm switch valve are simultaneously and coaxially exerted on the lifting diaphragm core as a positive pressure and a negative pressure, such that the valve diaphragm is not easily deformed eccentrically, so as to achieve the effect of force-saving switching of the diaphragm valve. The contact area by the closed valve body is substantially reduced to an annular shape, compared to the conventional isolated center contact with a large area, eccentric isolated contact, micro-particles/ions cannot be squeezed at the diaphragm interface when closed, and the micro-particle/ion precipitation in the medicaments used in the semiconductor/medical field does not easily occur. Moreover, the pressure difference for disconnecting fluid flow is coaxial and concentric with the central axis of valve, and is also coaxial with the elastic closing force of the elastic driving structure, such that the quantity of durable operations of the fluid switch of the diaphragm switch valve can be significantly increased. Compared with the conventional technology, the annular (or central) low suction of the fluid flowing out of the valve seat is directed downward along the central axis of valve, which can help the valve diaphragm to descent, so as to close the valve, and the central (or annular) high thrust caused by inflow of the fluid in the valve seat is directed upward along the central axis of valve, so that the valve diaphragm is not subjected to an eccentric force, in particular, the elastic closing force can be adjusted to be smaller, such that the lifting diaphragm core of the valve diaphragm can better descent and ascend for switching. In a specific example, in applications in the semiconductor/medical field, the quantity of durable operations of a fluid switch can reach more than a million times, which is industrially valuable.

An assembly method for a diaphragm switch valve is further provided, wherein the assembly method for a diaphragm switch valve is configured for manufacturing the diaphragm switch valve, the assembly method for a diaphragm switch valve comprises:
- providing the elastic driving structure of the valve body, connecting the elastic driving structure to the valve housing,
- mounting the valve diaphragm and the elastic driving structure connected with the valve housing, to constitute the valve body, and
- disposing the valve housing on the valve seat, fixing the fixed diaphragm ring of the valve diaphragm while disposing the valve housing on the valve seat, the valve diaphragm is subjected to an elastic force of the elastic driving structure in a position relative to the valve housing, so as to close the central fluid passage port.

In the present embodiment, the elastic driving structure and the valve housing are firstly assembled and connected, then the valve diaphragm is mounted, the fixed diaphragm ring of the valve diaphragm can be fixed while the valve housing is disposed on the valve seat, such that the valve diaphragm does not need to be welded to the valve seat or the valve body, which has the effects of easy assembly and quick disassembly and good leakage-proof sealing.

In summary, the present disclosure includes at least one of the following technical effects.

1. A blade seal with zero leakage of the fluid passage in the valve seat and a compressible spring pressing design are provided.
2. The diaphragm flexure is designed as a reciprocating valve diaphragm in the shape of a semi-circle, wherein the extension stroke of the valve diaphragm can be digitalized based on the relative height of the screw cap minus the retraction length of one end of the valve stem in the stem accommodation hole.
3. Based on the three or more sealing structures of the valve body for preventing leakage, the fixed diaphragm ring is sealed in the valve inner shell, wherein the valve inner shell is provided with O-rings above and below the leakage detection holes relative to the valve outer shell, such that the medicament cannot leak into a working chamber of the elastic member in the valve housing.
4. The leakage detection holes provide a drainage port structure for the medicament medium when the diaphragm flexure of the valve diaphragm is broken, which is far away from the elastic driving structure.
5. The diverging conical depression of the valve diaphragm and the surrounding fluid passage port provide a fluidics design which can reduce the flow disturbance when the valve is opened.
6. When the lifting diaphragm core ascents, the fluid flows through the central fluid passage port and the surrounding fluid passage port, and the active face of the annular knife-edge faces the surrounding fluid passage port, such that there is no dead zone in the inner flow passage.
7. The leaked liquid pre-leaks through the leakage detection holes, so as to prevent the working chamber of the elastic member in the valve body from being eroded.

DETAILED DESCRIPTION

Figure 1:
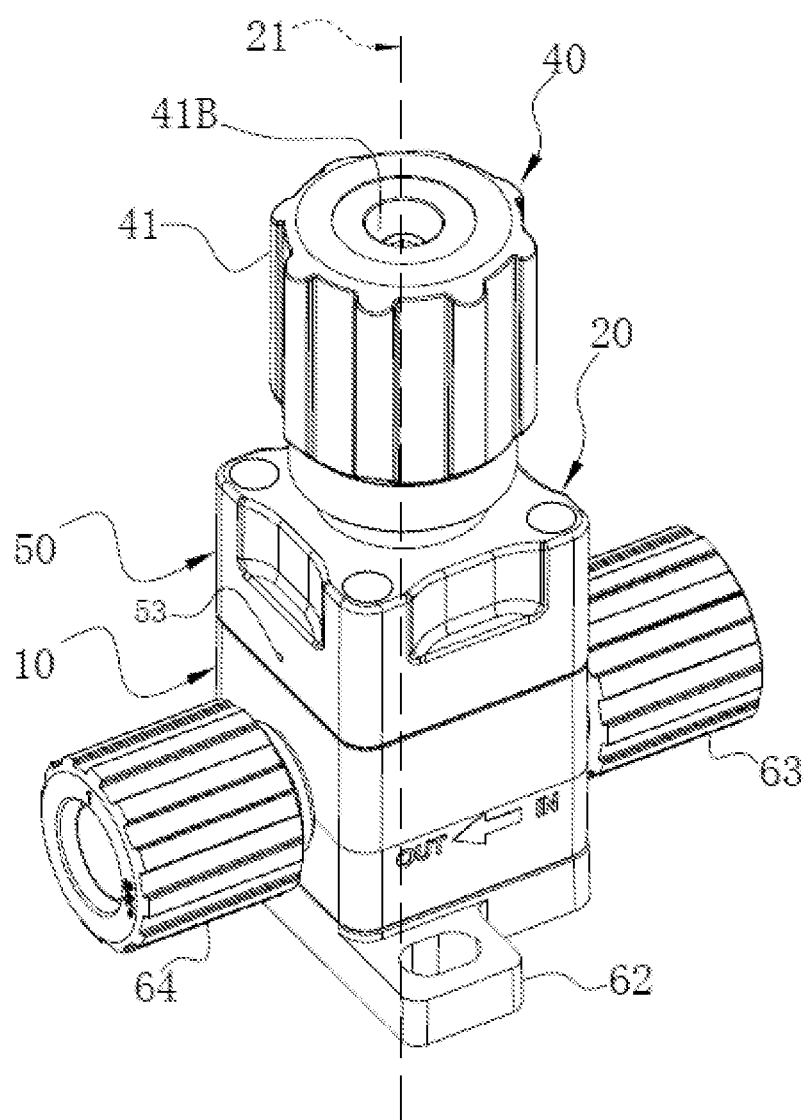
FIG. 1 depicts a perspective schematic diagram of the diaphragm switch valve according to some embodiments of the present disclosure.

The technical solutions in the embodiments of the present disclosure will be clearly and completely described below with reference to the accompanying drawings of the embodiments of the present disclosure. It is to be understood that the described embodiments are intended only as part of the embodiments of the inventive concept of the present disclosure and are not intended to represent all the embodiments or an explanation of the only embodiments. Based on the embodiments of the present disclosure, all other embodiments obtained by those of ordinary skill in the art upon understanding the inventive concept of the present disclosure fall within the scope of the present disclosure.

It should be noted that, if an orientation indication (such as up, down, left, right, front, rear . . . ) is involved in an embodiment of the present disclosure, the orientation indication is only used for explaining the relative positional relationship, movement condition and the like between components at a certain posture, and if the certain posture is changed, the orientation indication is changed accordingly. In order to facilitate the understanding of the technical solution of the present disclosure, the diaphragm switch valve of the present disclosure and the assembly method for the same are described and explained in further detail below, but are not intended to limit the scope of the present disclosure.

FIGS. 1-5 depict a diaphragm switch valve according to some embodiments of the present application. The accompanying drawings are intended to represent parts of various embodiments that are common to the various embodiments and to represent parts that are characteristic of individual embodiments. Parts that differ or are distinguished from one embodiment to another are described in language or are presented in a manner of comparison with the drawings, for example, the position where the annular knife edge is formed or the parts, which are not recorded in the claims, belong to insubstantial features. Therefore, on the basis of industrial characteristics and technical essence, a person skilled in the art would have been able to correctly and reasonably understand and determine whether an individual technical feature or any multiple combinations thereof described below can be characterized to the same embodiment, or whether multiple technical features mutually exclusive in technical essence can be respectively characterized to different variant embodiments. The "medicament" described in the present disclosure may be ultra-pure water used in a semiconductor process in addition to a reaction solution or a pharmaceutical medicament used in a semiconductor manufacturing process.

The diaphragm switch valve shown in the drawings is particularly applicable to the fluid control of ultra-pure chemical etching equipment and electronic ultra-pure water cleaning equipment, and has the effects of corrosion resistance, high temperature resistance, no clean dead zone in valve chamber, zero leakage, and no particle and ion precipitation.

Figure 2:
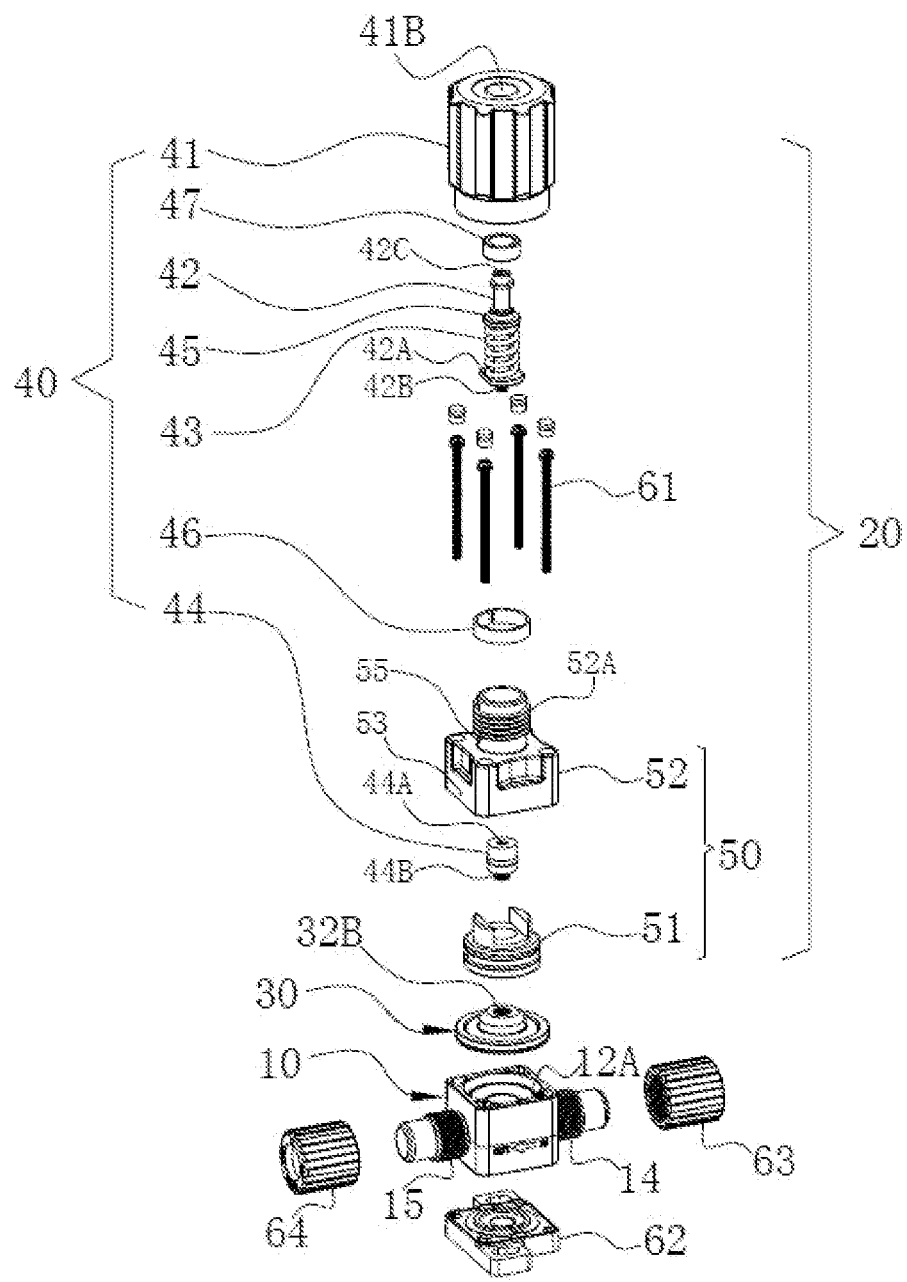
FIG. 2 depicts an exploded schematic diagram of the diaphragm switch valve according to some embodiments of the present disclosure.
Figure 3:
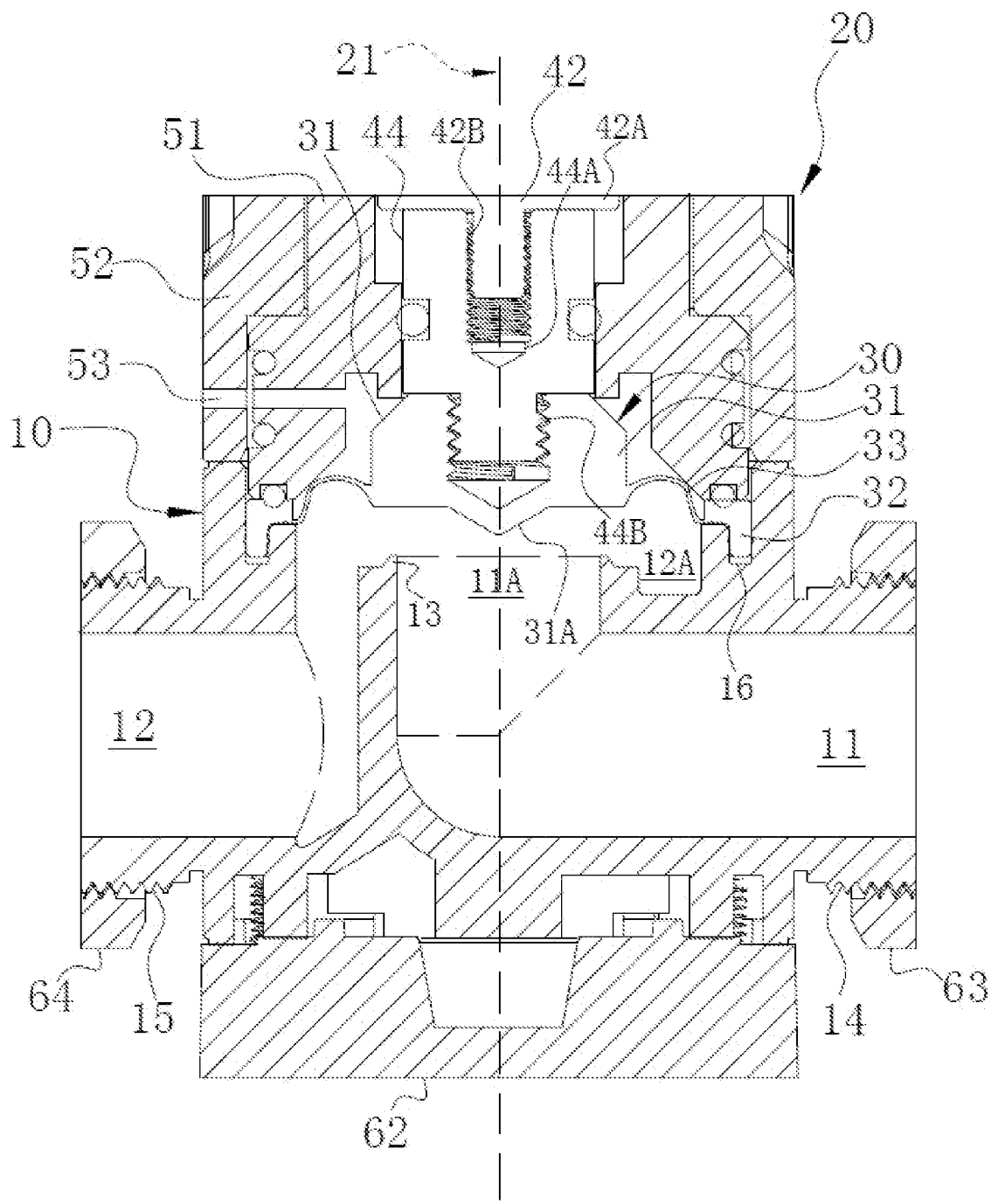
FIG. 3 depicts a cross-sectional schematic diagram of a lower half of the diaphragm switch valve with respect to the fluid passage of a coaxial fluid passage port according to some embodiments of the present disclosure.
Figure 4:
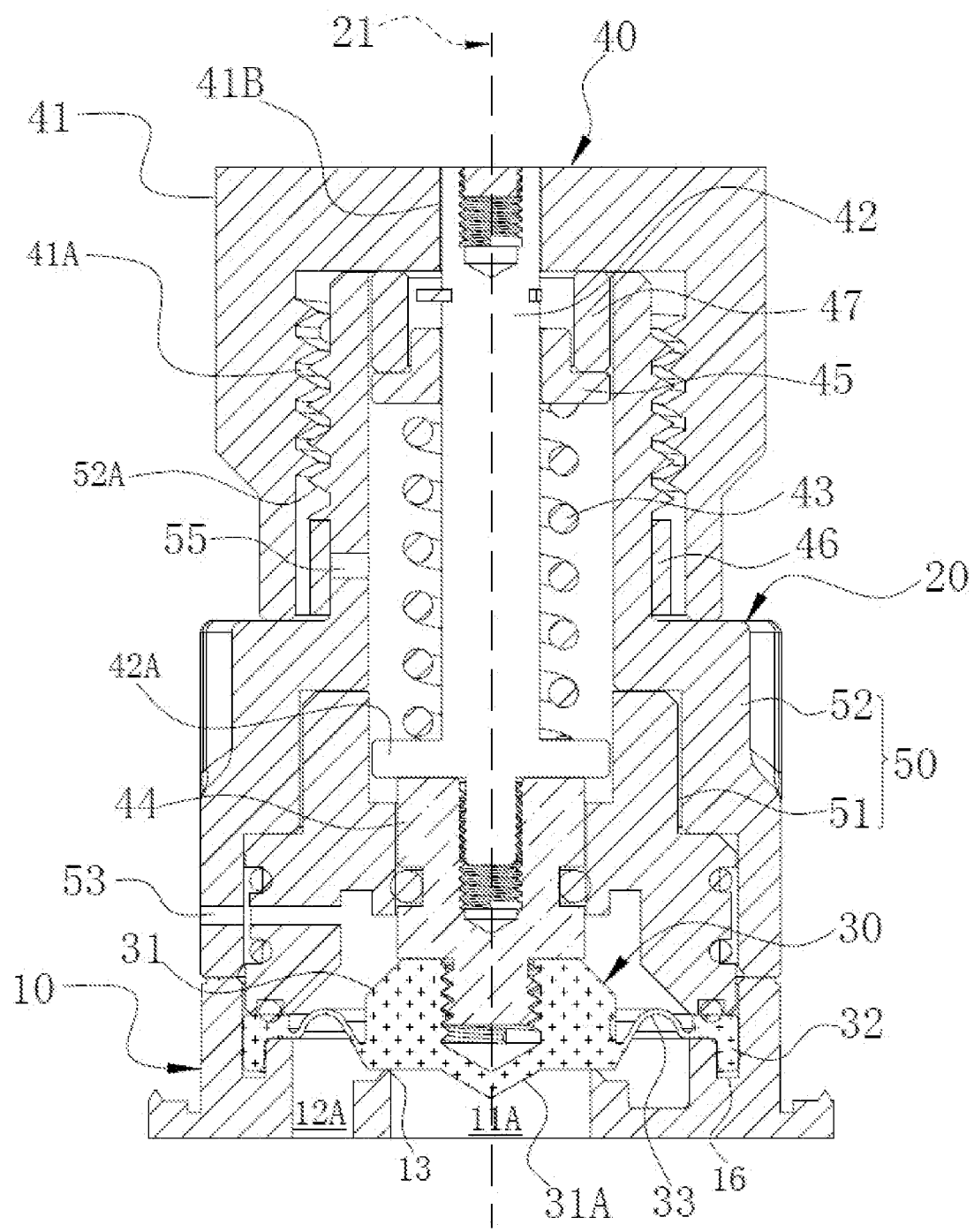
FIG. 4 depicts a cross-sectional schematic diagram of the upper half of the diaphragm switch valve with respect to a compressible elastic actuator according to some embodiments of the present disclosure.
Figure 5:
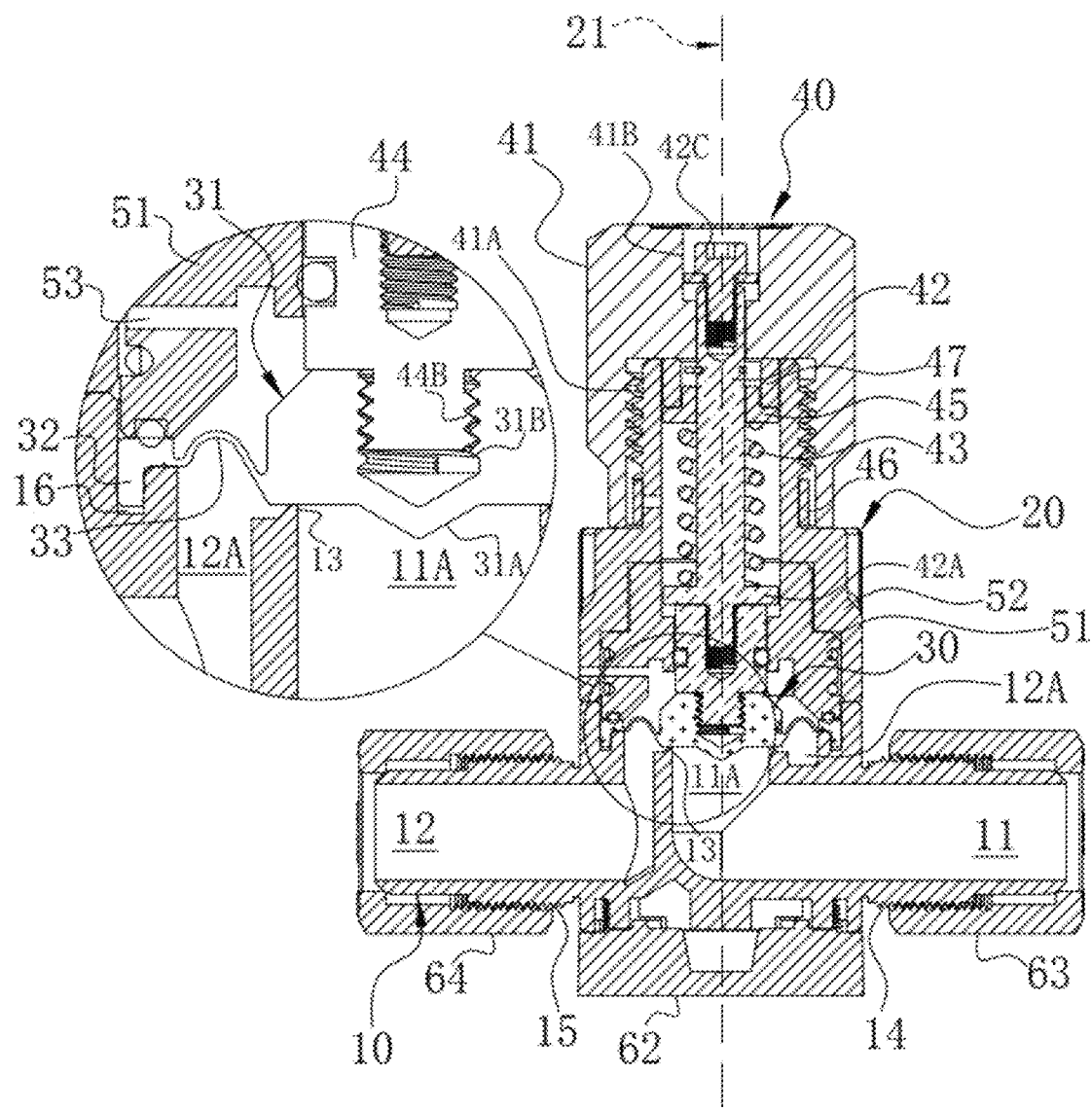
FIG. 5 depicts a cross-sectional schematic diagram and a partial enlarged diagram of the diaphragm switch valve according to some embodiments of the present disclosure when the valve is closed.
Figure 6:
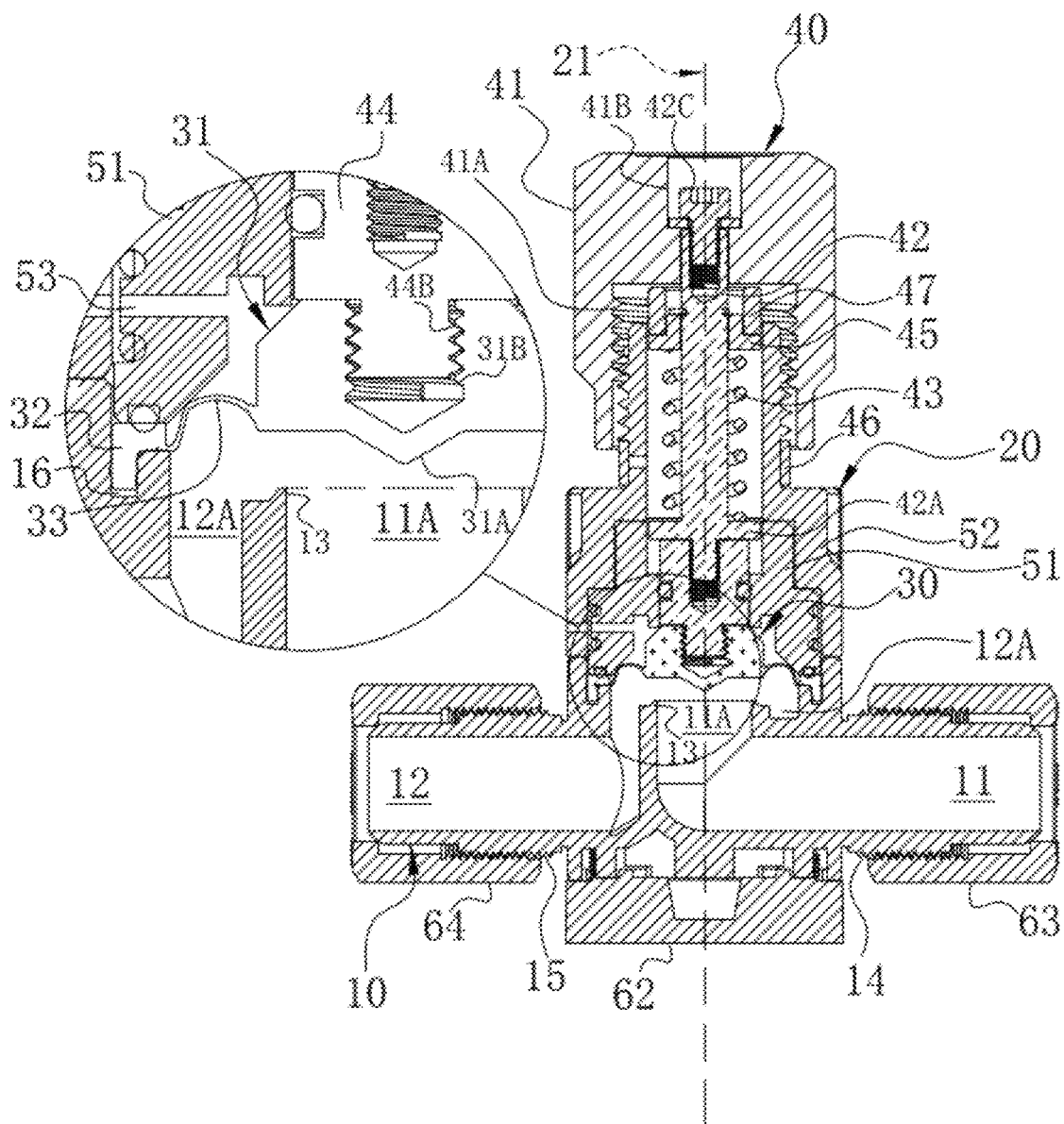
FIG. 6 depicts a cross-sectional schematic diagram and a partial enlarged diagram of the diaphragm switch valve according to some embodiments of the present disclosure when the valve is opened.

As shown in FIGS. 1 to 4, a diaphragm switch valve according to an embodiment of the present disclosure includes a valve seat 10 configured for providing two (or more) switchable fluid passages, and a valve body 20 on the valve seat 10 configured for disconnecting the fluid passages. Referring to FIGS. 3 and 4, the valve body 20 defines a central axis of valve 21, which extends in a direction corresponding to a lifting direction of the valve switch. Referring to FIG. 3, the valve seat 10 is configured with a first fluid passage 11 and a second fluid passage 12 transverse to a liquid inlet and a liquid outlet. In this embodiment, the first fluid passage 11 may be a liquid inlet passage and the second fluid passage 12 may be a liquid outlet passage. In a variant, the first fluid passage 11 may be a liquid outlet passage and the second fluid passage 12 may be a liquid inlet passage. Among these, it is preferable to use the first fluid passage 11 as the liquid inlet passage, which will be described later. With reference to FIGS. 1, 2 and 3, a first pipe joint 14 is provided radially outside an outlet pipe of the first fluid passage 11, so as to be sleeved by a first pipe sleeve 63 and realize a pipe connection on one side of the valve seat 10 in a clamping manner (as shown in FIGS. 5 and 6); a second pipe joint 15 is provided radially outside an outlet pipe of the second fluid passage 12, so as to be sleeved by a second pipe sleeve 64, and realize a pipe connection on the other side of the valve seat 10 in a clamping manner (as shown in FIGS. 5 and 6). The outlet pipe periphery of the first fluid passage 11 and of the second fluid passage 12 may be chamfered, and the first pipe sleeve 63 and the second pipe sleeve 64 are correspondingly provided with angled necking, thereby increasing the clamping effect of pipe.

Referring to FIGS. 2, 3 and 4, the valve body 20 includes a valve diaphragm 30 configured for switching valve, an elastic driving structure 40 configured for driving the valve diaphragm 30 to ascend and descend along the central axis of valve 21 for switching valve, and a valve housing 50 configured for providing an accommodation space for the valve diaphragm 30 to ascend and being connected to the elastic driving structure 40, the valve diaphragm 30 is configured for disconnecting the first fluid passage 11 and the second fluid passage 12.

Referring back to FIGS. 3 and 4, the valve diaphragm 30 includes a lifting diaphragm core 31 concentric with the central axis of valve 21, a fixed diaphragm ring 32 which is limited, and a diaphragm flexure 33 configured for flexibly connecting the lifting diaphragm core 31 and the fixed diaphragm ring 32. In the embodiment, an outer peripheral edge of the lifting diaphragm core 31 is a small circle, an outer peripheral edge of the fixed diaphragm ring 32 is a large circle, and the two circles are concentrically arranged. The diaphragm flexure 33 is located between the lifting diaphragm core 31 and the fixed diaphragm ring 32. When the valve is switched, the fixed diaphragm ring 32 is fixed, the lifting diaphragm core 31 is driven to ascend and descend, and the diaphragm flexure 33 is correspondingly bent based on the ascending and descending of the lifting diaphragm core 31. The diaphragm flexure 33 is bent towards the elastic driving structure 40, a radial length of the diaphragm flexure 33 is greater than a radial distance between the lifting diaphragm core 31 and the fixed diaphragm ring 32, and a radial length of the diaphragm flexure 33 on one side is related to a diameter of the central fluid passage port 11A, which is about 60-80% of the diameter of the central fluid passage port 11A, namely, the larger the diameter of the central fluid passage port 11A is, the higher a lifting height of the lifting diaphragm core 31 of the valve diaphragm 30 is, and the longer the lifting diaphragm core 31 configured for connecting the fixed diaphragm ring and the lifting diaphragm core becomes. The thickness of each of the lifting diaphragm core 31 and the fixed diaphragm ring 32 can be greater than the thickness of the diaphragm flexure 33, in particular, the thickness of the diaphragm flexure 33 is about 0.4-0.5 mm. The smaller the thickness of the diaphragm flexure 33, the better, to improve the deflection of the valve lifting switch, meanwhile, the thickness of the diaphragm flexure 33 is desirably thick enough to avoid rupture of the diaphragm. The present disclosure makes use of the fact that the center point of the force exerted on the valve diaphragm 30 is concentrated at a point on the central axis of valve 21 when the valve is driven to ascend and descend, so that the diaphragm flexure 33 can be uniformly stressed without breaking due to local stress. In the present embodiment, the lifting diaphragm core 31, the fixed diaphragm ring 32 and the diaphragm flexure 33 are shaped in one-piece, and the material of the valve diaphragm 30 may be PTFE (polytetrafluoroethylene). In an alternative embodiment, as shown in FIGS. 3 and 4, the cross section of the fixed diaphragm ring 32 has an inverted L-shape or a rectangular shape with an angle so as to be clamped and fixed between the valve housing 50 (specifically including a valve inner shell 51 and a valve outer shell 52) and the valve seat 10, so that the fixed diaphragm ring 32 can be well fixed and cannot be easily removed when being assembled. The diaphragm flexure 33 optionally extends from a lower side of the fixed diaphragm ring 32 near the valve seat 10, to provide a better upward flexure space and prevent the diaphragm flexure 33 from being pinched.

Referring to FIG. 3, the first fluid passage 11 is bent upward along the central axis of valve 21 in the valve seat 10, to form a central fluid passage port 11A, which is directed toward the lifting diaphragm core 31. The second fluid passage 12 forms a surrounding fluid passage port 12A surrounding the central fluid passage port 11A within the valve seat 10, the surrounding fluid passage port 12A is directed to the diaphragm flexure 33.

More specifically, in the present embodiment, the valve seat 10 is provided with an annular knife-edge 13 at the inner pipe edge between the central fluid passage port 11A and the surrounding fluid passage port 12A, so as to contact the lifting diaphragm core 31 of the valve diaphragm 30 when the valve body 20 is closed. Or in a variant, the lifting diaphragm core 31 is provided with an annular knife-edge 13 (not depicted in the drawings) so as to contact the inner pipe edge of the valve seat 10 between the central fluid passage port 11A and the surrounding fluid passage port 12A when the valve body 20 is closed. When the valve body 20 is closed, a pressure center point of the lifting diaphragm core 31 is located on the central axis of valve 21.

The implementation principle of the present embodiment is described referring to the closed valve in FIG. 5 and the opened valve in FIG. 6. When the valve body 20 is closed, the pressure center point of the lifting diaphragm core 31 is located on the central axis of valve 21 by means of the elastic closing force provided by the switch structure of the valve body 20, which is coaxial and concentric with the fluid, in combination with the valve body 20. The contact area by a closed valve between the valve diaphragm 30 and the valve seat 10 only lies in a region of the lifting diaphragm core 31 corresponding to the annular knife-edge 13, the pressure for connecting and disconnecting the fluid flow of the diaphragm switch valve are simultaneously exerted on the lifting diaphragm core 31 coaxially as a positive pressure and a negative pressure, such that the valve diaphragm 30 is not easily deformed eccentrically, and the stress point of the lifting diaphragm core 31 is concentrated on the central axis of valve 21, so as to achieve the force-saving switching of the diaphragm valve. The contact area by a closed valve is substantially reduced to an annular shape (corresponding to the annular knife-edge 13), compared to the conventional isolated center contact with a large area, eccentric isolated contact, micro-particles/ions cannot be squeezed at the diaphragm interface by a closed valve, and the micro-particle/ion precipitation in the medicaments used in the semiconductor/medical field does not easily occur. Moreover, the pressure difference for disconnecting fluid flow is coaxial and concentric with the central axis of valve 21, and is also coaxial with the elastic closing force of the elastic driving structure 40, such that the quantity of durable operations of the fluid switch of the diaphragm switch valve can be significantly increased. Compared with the conventional technology, the annular (or central) low suction of the fluid flowing out of the valve seat 10 is directed downward along the central axis of valve 21, which can help the valve diaphragm 30 to descend, so as to close the valve, and the central (or annular) high thrust caused by inflow of the fluid in the valve seat 10 is directed upward along the central axis of valve 21, so that the valve diaphragm 30 is not subjected to an eccentric force, in particular, the elastic closing force can be adjusted to be smaller, such that the lifting diaphragm core 31 of the valve diaphragm 30 can better descent and ascend for switching. In a specific example, in applications in the semiconductor/medical field, the quantity of durable operations of a fluid switch can reach more than a million times, which is industrially valuable.

With reference to FIG. 3, in an optional embodiment of a specific configuration of the fluid passage, the first fluid passage 11 is a liquid inlet passage to apply an upward pressure to the lifting diaphragm core 31 along the central axis of valve 21, and the second fluid passage 12 is a liquid outlet passage to apply a downward suction along the central axis of valve 21 to the lifting diaphragm core 31. When the valve body 20 is closed, the elastic closing force provided by the elastic driving structure 40 is greater than the difference of the upward pressure minus the downward suction. As shown in FIG. 5, when the valve is closed, the lifting diaphragm core 31 closes the central fluid passage port 11A, such that a liquid outlet pressure at the position above the surrounding fluid passage port 12A corresponding to the diaphragm flexure 33 is lower, the diaphragm flexure 33 is more durable, and the service life of the valve diaphragm 30 which can endure multiple valve switches is longer. In the case that the first fluid passage 11 is configured as a liquid inlet passage and the second fluid passage 12 is configured as a liquid outlet passage, a central upward pressure is generated in the central fluid passage port 11A, and an annular downward suction is generated at the surrounding fluid passage port 12A. As shown in FIG. 5, when the valve is closed, there is a lower fluid pressure in the second fluid passage 12 than in the first fluid passage 11, so that a lower fluid pressure exists at the diaphragm flexure 33 of the valve diaphragm 30. When the lifting diaphragm core 31 ascends and descends to open and close the valve, the diaphragm flexure 33 will not continue to flex under the high-pressure fluid pressure in the liquid inlet passage, such that the quantity of durable operations of the fluid switch can be significantly increased.

In the embodiment with respect to the annular knife-edge 13 of the valve seat 10, referring to FIG. 3, the active face the annular knife-edge 13 is directed to the surrounding fluid passage port 12A. Optionally, when the annular knife-edge 13 is convexly and locally provided at the inner pipe edge of the valve seat 10, the lifting diaphragm core 31 is configured with an indentation corresponding to the annular knife-edge 13. The active face of the annular knife-edge 13 is so oriented, that insoluble or crystalline micro-particles or ions in the medicament are more easily expelled from the active face into the second fluid passage 12, where the fluid pressure is lower, and will not be clamped at the contact interface between the diaphragm and the valve seat 10 when the valve is closed. Optionally, the annular knife-edge 13 is convexly and locally provided on the inner pipe edge of the valve seat 10, while the lifting diaphragm core 31 is configured with an indentation corresponding to the annular knife-edge 13, such that the interface by a closed valve is non-planar and of a thin ring by means of the elastic closing force, so that the valve closing effect is better. The inner pipe edge of the valve seat 10 does not have a remaining part of the annular knife-edge 13, so that the annular knife-edge 13 can be avoided from penetrating into the lifting diaphragm core 31 too deeply. The inclined angle of the annular knife-edge 13 should be between 20 and 45 degrees, specifically about 30 degrees, wherein 0 degree means that there is no inclination and the inner pipe edge extends horizontally.

In an optional embodiment with respect to the specific structure of the valve diaphragm 30, referring to FIGS. 3 and 4, the lifting diaphragm core 31 of the valve diaphragm 30 has a diverging conical depression 31A aligned with the central axis of valve 21, and the diameter of the diverging conical depression 31A is smaller than the diameter of the central fluid passage port 11A. With the help of the diverging conical depression 31A, the medicament flowing through the central fluid passage port 11A can better dispersedly flow to the surrounding fluid passage port 12A, or the medicament flowing through the surrounding fluid passage port 12A can better intensively flow to the central fluid passage port, so as to reduce disturbance and eliminate stagnant dead zones.

In an optional embodiment with respect to the elastic driving structure 40, with reference to FIGS. 2 and 4, the elastic driving structure 40 specifically includes:

a screw cap 41 adjustably provided on an outer sidewall of the valve housing 50 and located on the valve housing 50, the screw cap 41 can specifically be a hand wheel, which can be rotated manually, to adjust the elastic force of the elastic member 43 when being compressed, when the screw cap 41 is rotated to move downwards, it can provide a greater collapsible elastic force, in a variant, the screw cap 41 can also be an electric driven wheel or an electric transmission wheel, a valve stem 42, which is telescopically provided under the screw cap 41 and is located in the valve housing 50 in alignment with the central axis of valve 21, the valve stem 42 is configured for synchronously driving the lifting diaphragm core 31 of the valve diaphragm 30 to ascend and descend, an elastic member 43 sheathed on the stem body of the valve stem 42, to provide the valve stem 42 with an outward elastic force with respect to the screw cap 41, the elastic member 43 specifically can be a compression spring configured for providing an elastic force for pushing out the valve stem 42, and a valve head 44 fixed at one end of the valve stem 42 departing from the screw cap 41, the valve diaphragm 30 is fixed on the valve head 44, when the screw cap 41 is rotated to drive the screw cap 41 to descend and ascend relative to the valve housing 50, the valve stem 42, the elastic member 43 and the valve head 44 do not rotate relative to one another, and the elastic member 43 provides an elastic closing force to the valve diaphragm 30 with a limited length.

With the specific structure of the elastic driving structure 40, the collapsible elastic driving function of the stem end can be realized. The rotation of the screw cap 41 does not bring the valve stem 42 to drive, the ascending and descending of the screw cap 41 also changes the lifting position of the valve stem 42 non-quantitatively, in particular, by the rotational ascending and descending of the screw cap 41 only the position of the top pushing point of an upper end of the elastic member 43 can be changed; on the contrary, the lifting diaphragm core 31 of the valve diaphragm 30 ascends and descends to synchronously drive the valve stem 42 to ascend and descend, which is not limited to a limitation of the screw cap 41. The valve stem 42 is characterized in the collapsible elastic force. In the extreme case where the pulse high-pressure fluid overcomes the elastic force, the valve stem 42 will be elastically lifted, while the screw cap 41 can remain stationary, and the pressure of the pulse high-pressure fluid will not damage the structure of the elastic driving structure 40. Specifically, the change of the pulse fluid pressure flowing into the valve results in the change of the wave fluid pressure flowing out of the valve, i.e. the fluid pressure damping effect is achieved, such that the fluid pressure changes gradually and gently when the valve is opened.

Specifically, as shown in FIGS. 2, 4, 5 and 6, the inner wall of the screw cap 41 is provided with an internal thread 41A, which is screwed to an external thread 52A of the valve outer shell 52 of the valve housing 50. By means of the rotation of the screw cap 41, the height position of the screw cap 41 with respect to the valve housing 50 can be changed, and accordingly the height position of the retention ring 45 can be changed synchronously, thereby changing the position, at which the elastic member 43 is pushed upward to reach its maximum extension, to be in a lower space position. With reference to FIG. 5, when the screw cap 41 is rotated and sinks, the retention ring 45 also sinks, such that the elastic member 43 has a greater elastic force, which urges the valve stem 42 to move downwards until the lifting diaphragm core 31 of the valve diaphragm 30 closes the central fluid passage port 11A of the first fluid passage 11. At this time, the screw cap 41 is located at a lower position with respect to the valve outer shell 52 while the upper end of the valve stem 42 is located at a relatively higher position in the stem accommodation hole 41B of the screw cap 41, i.e. in a state where the valve stem is elastically retracted to close the valve. With reference to FIG. 6, when the screw cap 41 is rotated reversely and rises, the retention ring 45 also rises, thereby changing the position, at which the elastic member 43 is pushed upwards to reach its maximus extension, to be in a relative higher space position, such that the original retraction elasticity of the elastic member 43 decreases, the elasticity of the elastic member 43 is insufficient to close the valve, so that the first fluid passage 11 is in a fluid communication with the second fluid passage 12. At this time, the screw cap 41 is located at a higher position relative to the valve outer shell 52, however, the upper end of the valve stem 42 is located at a relatively low position in the stem accommodation hole 41B of the screw cap 41, i.e. in a state where the valve stem is elastically pressed out to open the valve.

Specifically, as shown in FIGS. 2, 4, 5 and 6, the upper end of the valve stem 42 is further configured with a hole for adjusting stem 42C, specifically a hexagonal screw hole, which is configured to change the working length of the valve stem 42 for the elastic member 43. More specifically, the upper end of the valve stem 42 is screwed with a stem head, the hole for adjusting stem 42C is defined on the stem head, the stem head can be rotated with a tool through the hole for adjusting stem 42C, to change a depth to which the stem head is screwed into the valve stem 42, thereby changing a total length of the valve stem 42.

Specifically, as shown in FIGS. 2, 5 and 6, the valve head 44 is to allow the valve stem 42 to be connected to and to move the lifting diaphragm core 31 of the valve diaphragm 30, and to prevent the leaked medicament from directly flowing into the working chamber of the elastic member 43 during the ascending and descending of the lifting diaphragm core 31. As shown in FIGS. 2 and 3, the top end of the valve head 44 is configured with a coupling hole 44A configured to be coupled with the coupling segment 42B of the valve stem 42. As shown in FIG. 2, FIG. 5 and FIG. 6, the valve head 44 is provided at a lower end thereof with a joint portion 44B configured to be connected with the joint hole 31B of the lifting diaphragm core 31 of the valve diaphragm 30. The above-mentioned connection method may be a threaded connection or other fixing method. An O-ring can be provided radially outside the valve head 44.

In another embodiment with respect to the valve stem 42 of the elastic driving structure 40, referring to FIGS. 2, 5 and 6, the stem body of the valve stem 42 is provided with a collar 42A configured to be pushed by one end of the elastic member 43, the stem body of the valve stem 42 is sheathed with a retention ring 45 limited in the screw cap 41, the retention ring 45 is pushed by the other end of the elastic member 43 to ascend and descend along with the screw cap 41. More specifically, a gasket 47 is provided within the valve outer shell 52 of the valve body 20 and is sheathed over the stem body of the valve stem 42 between the retention ring 45 and the screw cap 41. The longer the gasket 47 is, the smaller the maximum ascending distance of the retention ring 45 with respect to the screw cap 41 is. When the screw cap 41 is in a fixed position, the longer retention ring 45 enables the elastic member 43 to have a larger elastic force. Specifically, referring to FIGS. 2, 5 and 6, the elastic driving structure 40 further includes a wearing ring 46 sheathed on the valve outer shell 52 of the valve housing 50 for blocking the medicament from leaking to the screw cap 41 from the working chamber of the elastic member 43 through the gas hole 55 of the valve outer shell 52 in case of serious leakage of medicament. The gas hole 55 of the valve outer shell 52 is configured to maintain the pressure balance between the working chamber of the elastic member 43 and the external air pressure during assembling and working of the elastic member 43.

In another embodiment with respect to the screw cap 41 of the elastic driving structure 40, the screw cap 41 is so configured, that the height of the screw cap 41 relative to the valve housing 50 is adjusted in a rotational manner, and the screw cap 41 is configured with a stem accommodation hole 41B concentrically aligned with the central axis of valve 21. When the height of the screw cap 41 relative to the valve housing 50 is reduced until the lifting diaphragm core 31 is able to elastically close the central fluid passage port 11A, one end of the valve stem 42 is retracted into the stem accommodation hole 41B with more length. When the height of the screw cap 41 relative to the valve housing 50 is increased until the lifting diaphragm core 31 is not able to elastically close the central fluid passage port 11A, the collar 42A is located in a relatively higher position. The opening degree of the lifting diaphragm core 31 is determined by the position where the upward pressure is equal to the sum of the downward suction due to outflow of fluid and the elastic force of the elastic member 43 under the compressed length and the weight of the moving components for opening and closing the valve. The moving components for opening and closing the valve includes the valve stem 42, the valve head 44 and the lifting diaphragm core 31 of the valve diaphragm 30.

In an optional embodiment with respect to the valve housing 50, referring to FIGS. 3 and 4, the valve housing 50 is configured with leakage detection holes 53 in communication with each other and in communication with an accommodation chamber of the valve housing 50 configured for the ascending of the valve diaphragm 30. When the diaphragm flexure 33 is broken, the leaked medicament preferentially flows out through the leakage detection holes 53 and does not penetrates into the working chamber of the elastic member 43 in the valve body 20 by means of the leakage detection holes 53.

In an optional embodiment with respect to the valve housing 50, referring to FIGS. 2, 3 and 4, the valve housing 50 includes a valve inner shell 51 and a valve outer shell 52, the valve inner shell 51 is configured with a space for accommodating the valve diaphragm 30, and the valve outer shell 52 is configured to be fixed on the valve seat 10. The valve seat 10 is further configured with a fixing groove 16 for limiting the fixed diaphragm ring 32. When the valve outer shell 52 is fixed on the valve seat 10, the circumferential edge of the valve inner shell 51 limits the fixed diaphragm ring 32 in the fixing groove 16, to prevent it from coming out from the fixing groove. With the specific structure of the valve housing 50, when the valve body 20 is connected with the valve seat 10, the fixed diaphragm ring 32 of the valve diaphragm 30 is synchronously fixed, thereby achieving a quick assembling and easy disassembling while preventing leakage.

In another optional embodiment with respect to the valve housing 50, referring to FIGS. 3 and 4, the leakage detection holes 53 penetrate one side of the valve inner shell 51 and the valve outer shell 52, so that the liquid leaks preferentially on the side away from the elastic driving structure 40 through the leakage detection holes 53 when there is liquid leakage. The leakage detection holes 53 are so positioned, that the leaked liquid is relatively away from the elastic driving structure 40 and easily detected without affecting the normal operation of the elastic driving structure 40, so as to avoid performance deterioration of the elastic driving structure due to liquid leakage. The valve inner shell 51 is provided with O-rings at the upper and lower sides of the leakage detection holes 53, respectively, to reduce any unrestricted diffusion of the leaked liquid. In addition, the valve inner shell 51 may be further provided with an O-ring at the bottom end at a relatively inner position substantially corresponding to the fixing groove 16 of the valve seat 10, so as to elastically press the fixed diaphragm ring 32 of the valve diaphragm 30.

Referring again to FIG. 2, the collar 42A of the valve stem 42 is optionally provided with a cut edge while the valve inner shell 51 is provided with a limit stop at corresponding position, such that the valve inner shell 51 can limit the rotation of the valve stem 42 after the two are connected. Therefore, when the screw cap 41 is rotated, it can't drive the valve stem 42 to rotate. However, when the valve stem is rotated to be tightened through the hole for adjusting stem 42C, the valve stem 42 can drive the valve inner shell 51 to rotate, so as to align the leakage detection holes 53 in the valve inner shell 51 with that in the valve outer shell 52.

With reference to the enlarged views of FIGS. 5 and 6 again, in an optional embodiment for preventing any infiltration and diffusion of leaked liquid, the fixing groove 16 can be configured with annular leakage-proof dents (one is open towards the central axis of the valve and the other is open away from the center axis of the valve). In addition, the leakage-proof dent on the valve seat 10 is intentionally mismatched with the sheathed fixed diaphragm ring 32 in shape, so as to prevent a continuous liquid leakage in a certain direction. In addition, the fixed diaphragm ring 32 can be configured with an annular leakage-proof dent (it is open towards a direction parallel to the central axis of the valve) at its lower surface in tight contact with the valve seat 10 outside the fixing groove 16, in particular, the leakage-proof dent on the valve diaphragm 30 is intentionally mismatched with the upper contact surface of the valve seat 10 in shape, so as to prevent a continuous liquid leakage in a certain direction.

Figure 7:
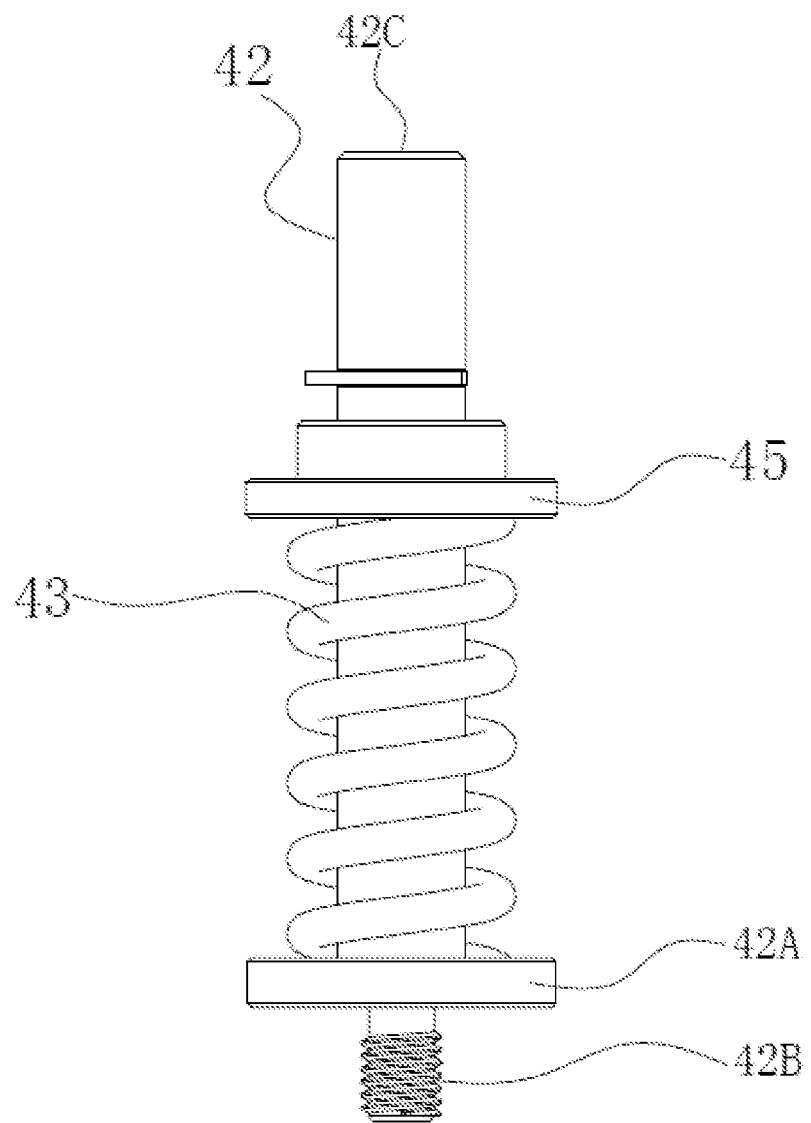
FIG. 7 depicts a schematic diagram of an elastic member in the assembly method for a diaphragm switch valve according to some embodiments of the present disclosure.
Figure 8:
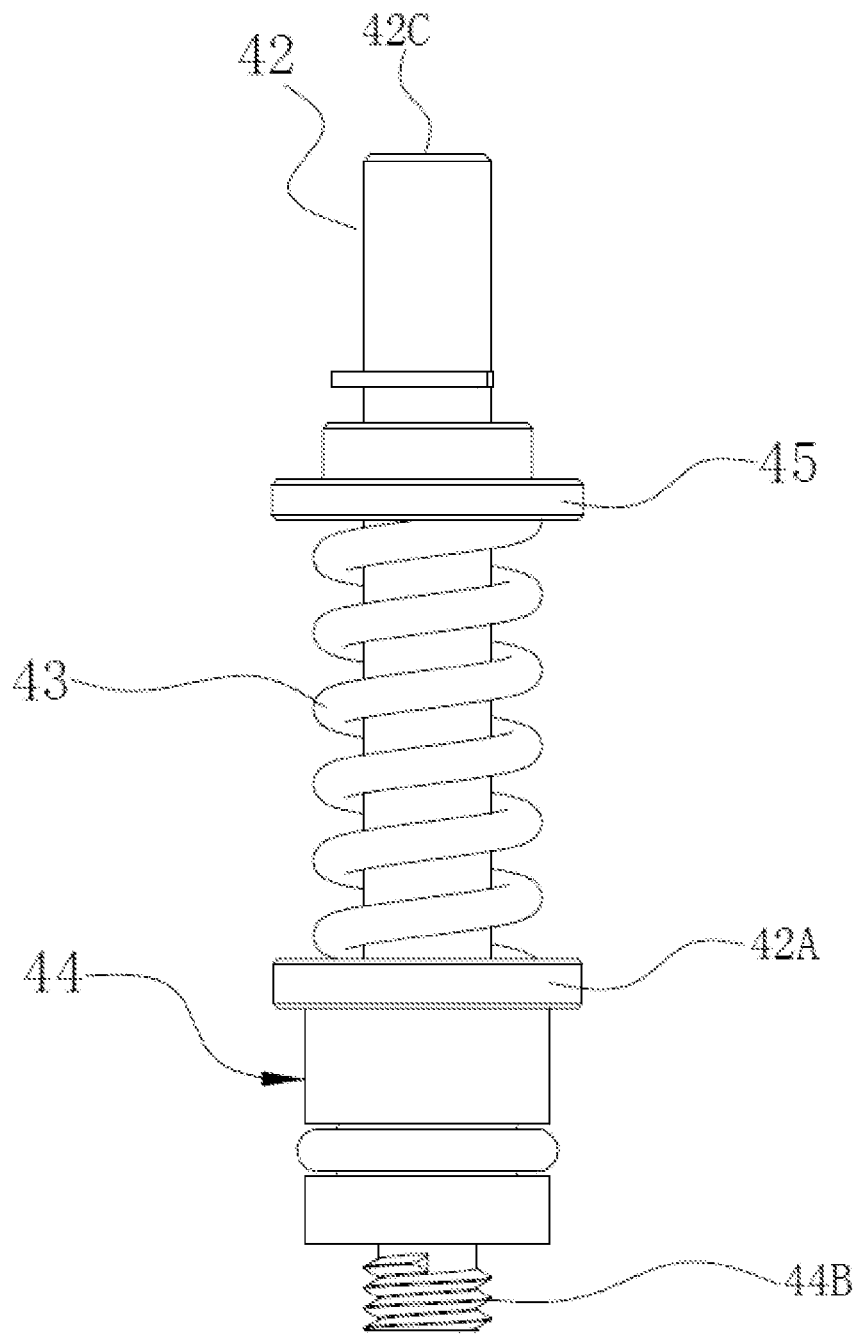
FIG. 8 depicts a schematic diagram showing that the elastic member is coupled with the valve head in the assembly method for a diaphragm switch valve according to some embodiments of the present disclosure.
Figure 9:
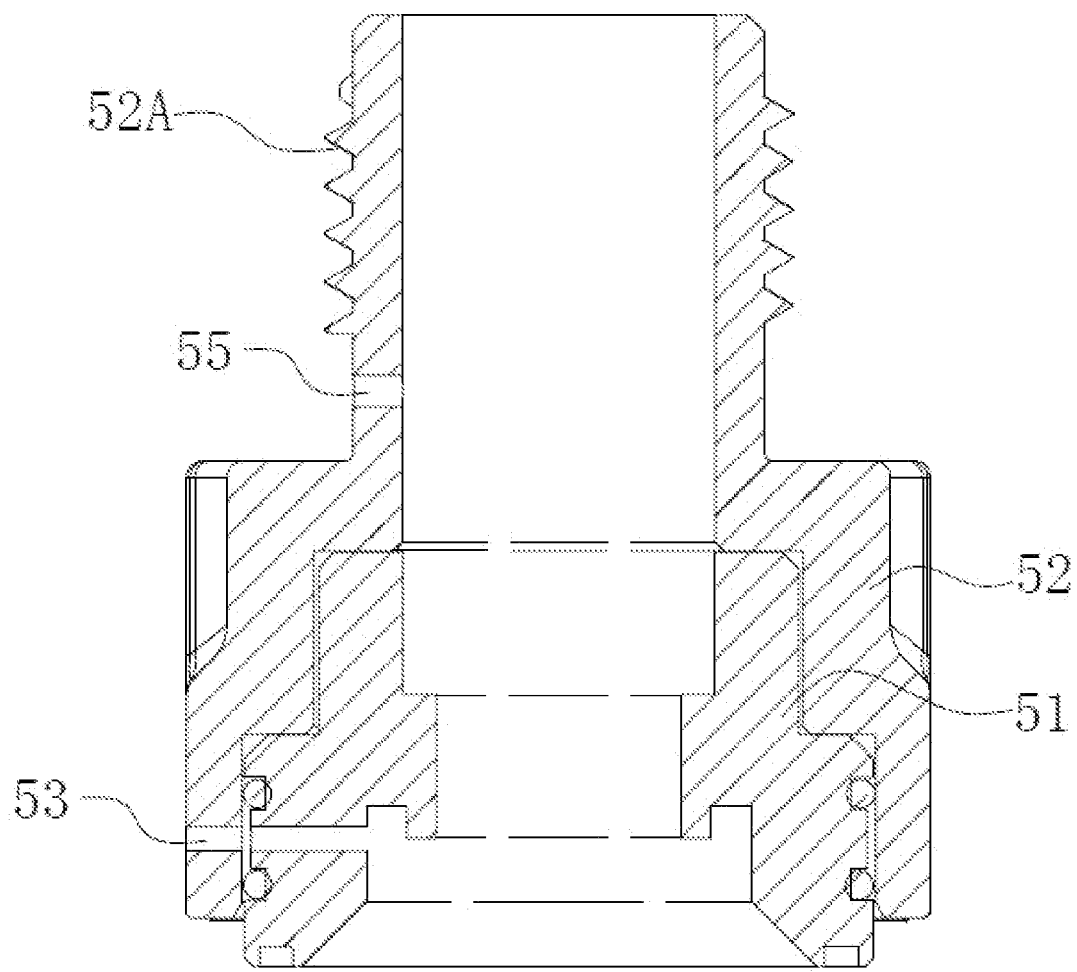
FIG. 9 depicts a schematic diagram of a valve housing in the assembly method for a diaphragm switch valve according to some embodiments of the present disclosure.
Figure 10:
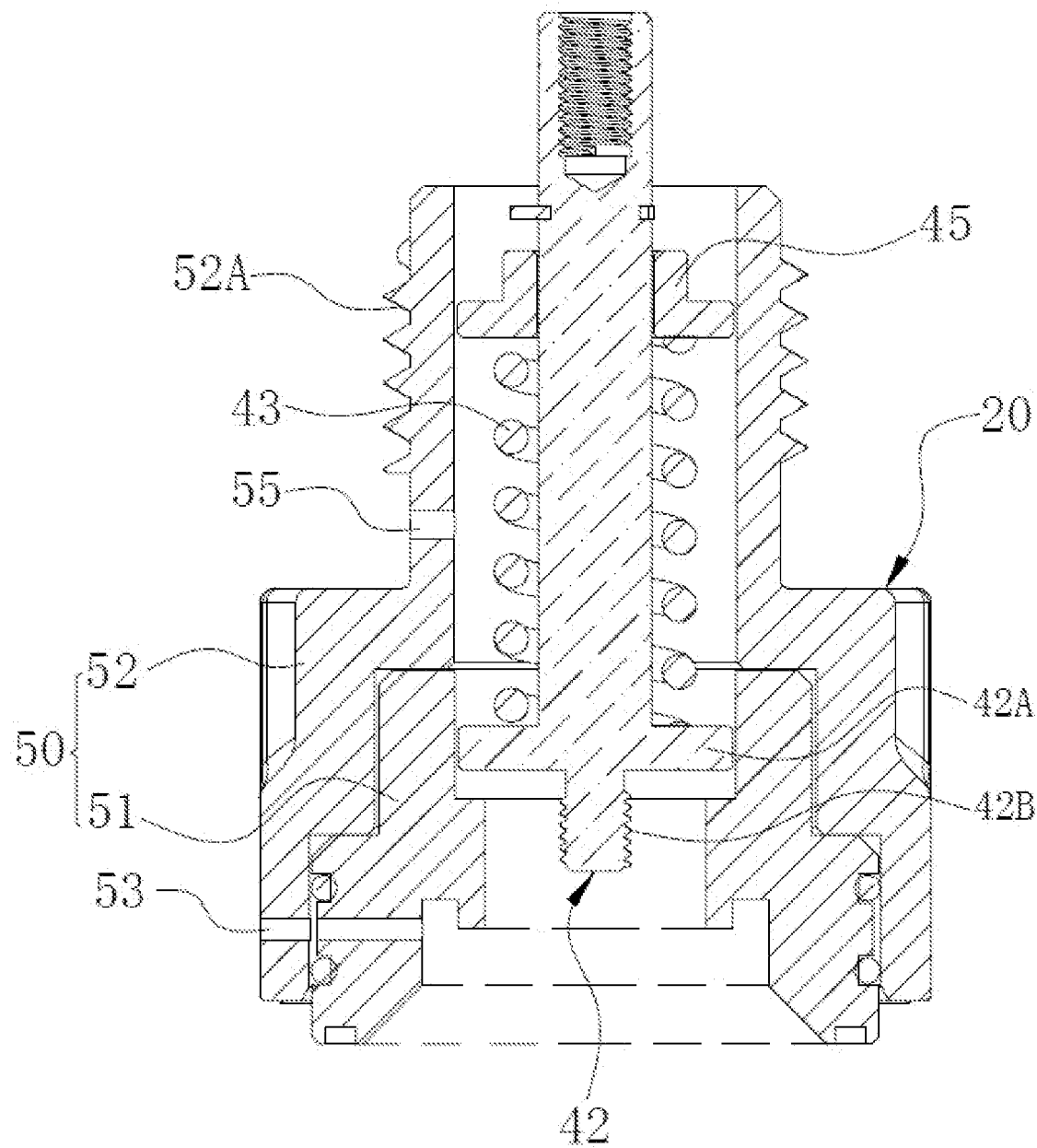
FIG. 10 depicts a schematic diagram of the state, in which the elastic member is sheathed on the valve housing after being coupled with the valve head in the assembly method for a diaphragm switch valve according to some embodiments of the present disclosure.
Figure 12:
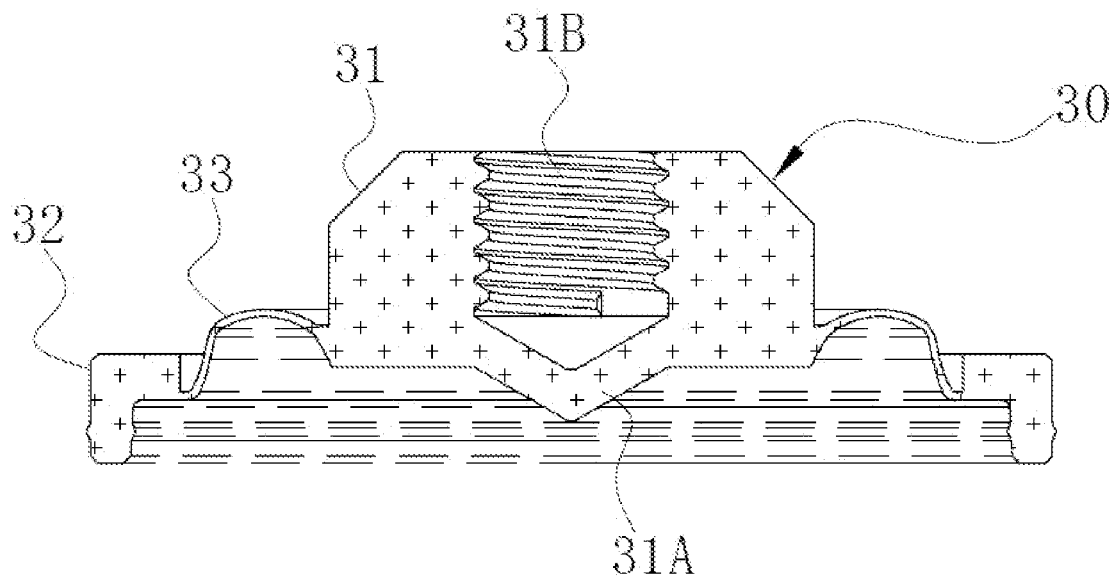
FIG. 12 depicts a schematic diagram of the valve diaphragm in the assembly method for a diaphragm switch valve according to some embodiments of the present disclosure.
Figure 13:
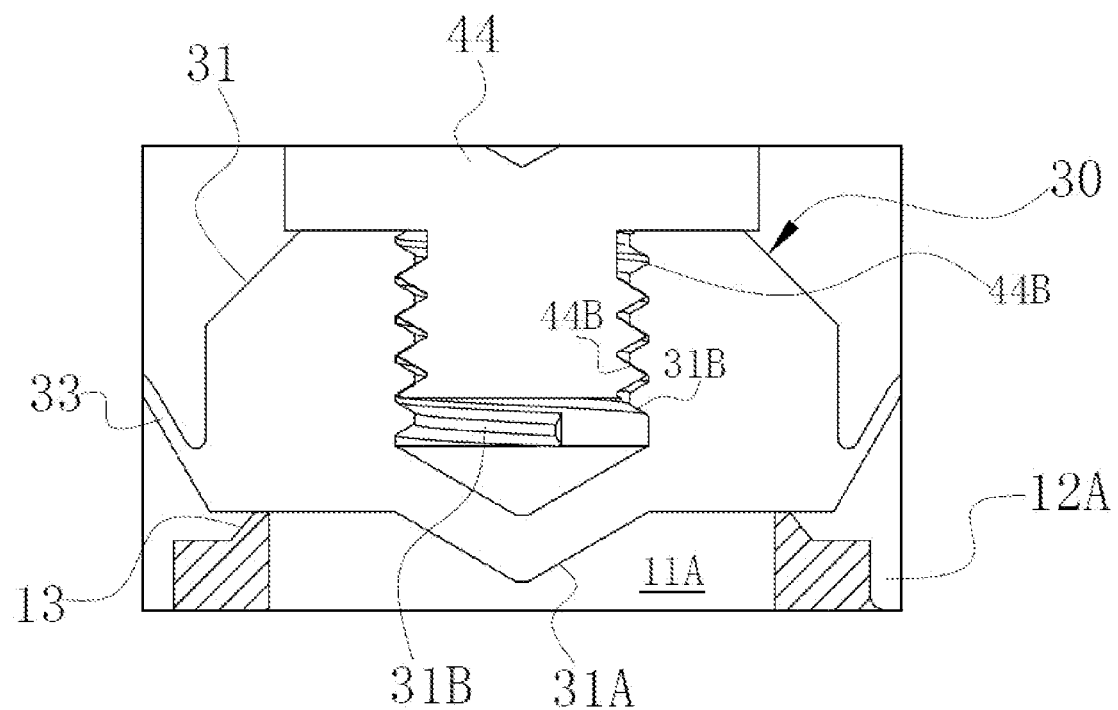
FIG. 13 depicts a schematic diagram showing that the valve diaphragm is coupled with the valve head in the assembly method for a diaphragm switch valve according to some embodiments of the present disclosure.
Figure 14:
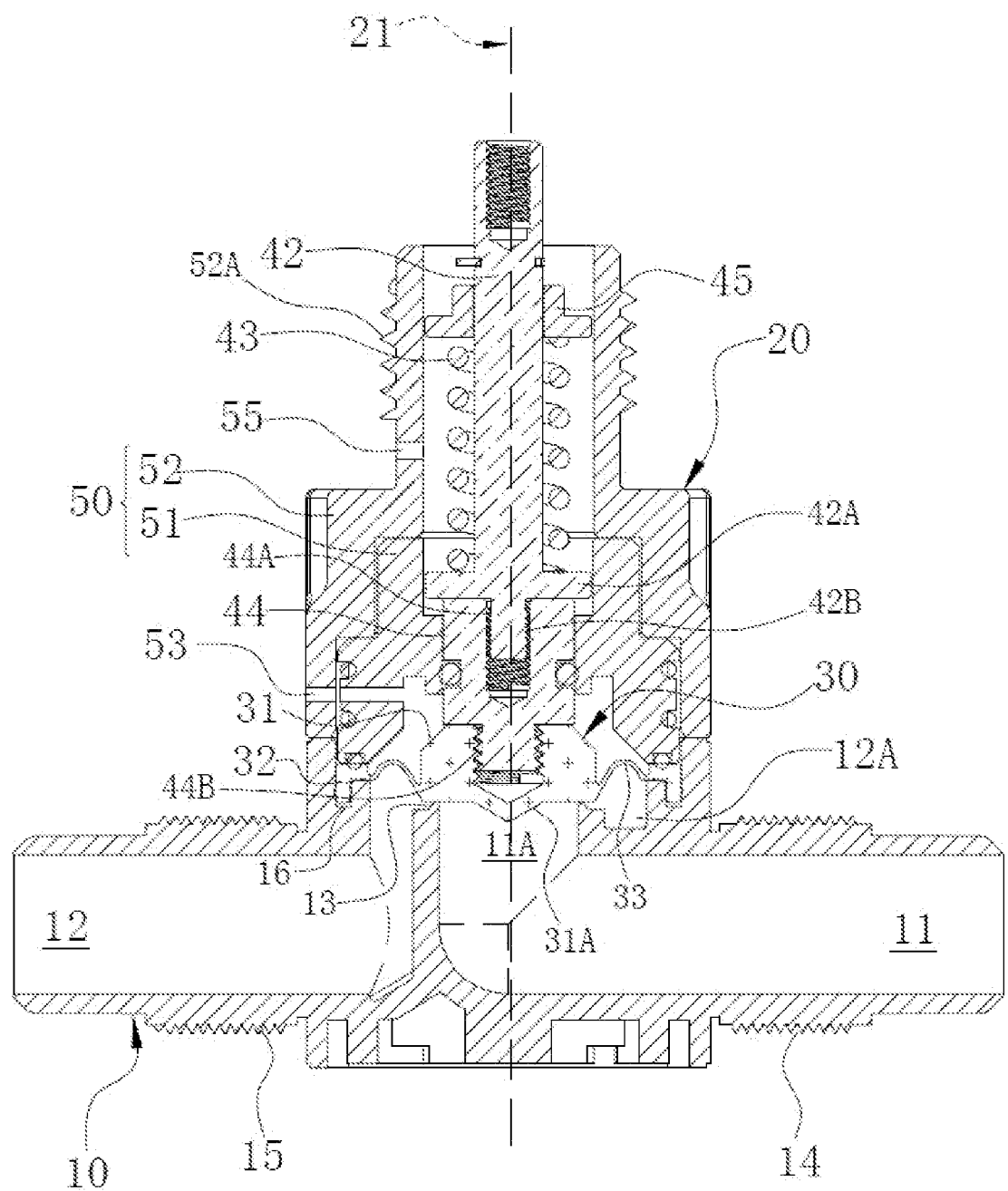
FIG. 14 depicts a schematic diagram showing that the valve housing is arranged on the valve seat in the assembly method for a diaphragm switch valve according to some embodiments of the present disclosure.

Further, an assembly method corresponding to the foregoing diaphragm switch valve is disclosed. An assembly method for a diaphragm switch valve is provided, which includes:

step S1, providing an elastic driving structure 40 of the valve body 20, as shown in FIG. 2 in combination with FIGS. 7 and 8;

step S2, connecting the elastic driving structure 40 to the valve housing 50, as shown in FIG. 2 in combination with FIGS. 9 and 10;

step S3, mounting the valve diaphragm 30 and the elastic driving structure 40 connected with the valve housing 50, to constitute the valve body 20, as shown in FIG. 2 in combination with FIGS. 12 and 13; and step S4, disposing the valve housing 50 on the valve seat 10, fixing a fixed diaphragm ring 32 of the valve diaphragm 30 while disposing the valve housing 50 on the valve seat 10, in particular, the valve diaphragm 30 is subjected to an elastic force of the elastic driving structure 40 in the position relative to the valve housing 50, so as to close the central fluid passage port 11A, as shown in FIG. 2 in combination with FIG. 14.

The implementation principle of this embodiment is that the elastic driving structure 40 and the valve housing 50 are firstly assembled and connected, then the valve diaphragm 30 is mounted, the fixed diaphragm ring 32 of the valve diaphragm 30 can be fixed while the valve housing 50 is disposed on the valve seat 10, in particular, the valve diaphragm 30 does not need to be welded to the valve seat 10 or the valve body 20, which has the effects of easy assembly and quick disassembly and good leakage-proof sealing.

Figure 11:
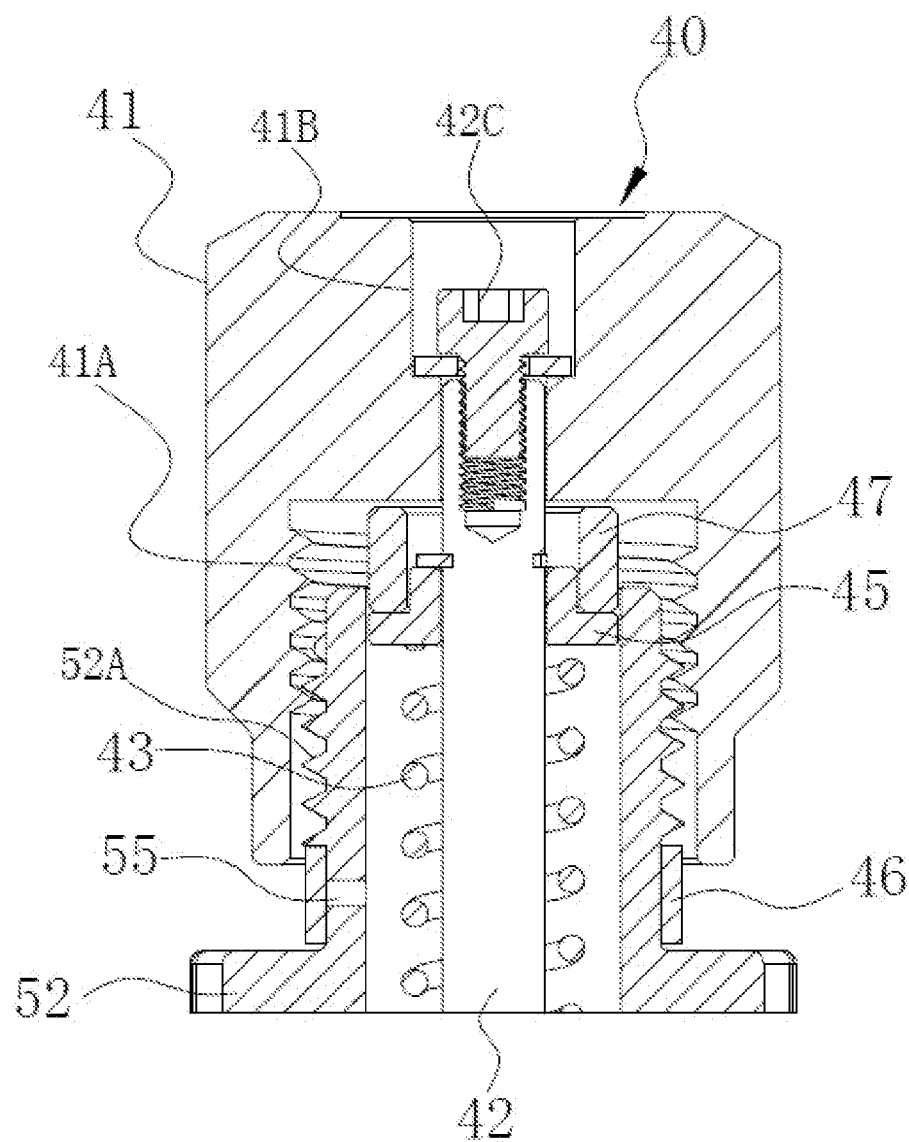
FIG. 11 depicts a schematic diagram showing that a screw cap is arranged on the valve housing in the assembly method for a diaphragm switch valve according to some embodiments of the present disclosure.

Referring to FIGS. 11 and 14, the mounting of the screw cap 41 of the elastic driving structure 40 has freedom and can be performed in any one of steps S1 to S4.

Referring to FIGS. 11 and 8 and 2, in an optional embodiment of the step S1 of providing an elastic driving structure 40 of the valve body 20, the elastic driving structure 40 includes a screw cap 41, a valve stem 42, an elastic member 43 and a valve head 44, the screw cap 41 is screwed to an outer sidewall of the valve housing 50 and located on the valve housing 50, the valve stem 42 is telescopically provided under the screw cap 41 and is located in the valve housing 50 concentrically with the central axis of valve 21, the elastic member 43 is sheathed on a stem body of the valve stem 42, to provide an elastic force to the valve stem 42 to push out the valve stem relative to the screw cap 41, and the valve head 44 is fixed at one end of the valve stem 42 departing from the screw cap 41. The screw cap 41 also may not be provided in step S1. As shown in FIG. 7, the valve stem 42 having the collar 42A is first inserted into the elastic member 43 and the retention ring 45. Then, a snap ring is attached to the retention ring 45, to form an elastic valve stem assembly capable of fixing the elastic member 43 in advance. The coupling segment 42B of the valve stem 42 then is coupled with the valve head 44 provided with an O-ring in a threaded or other known fixing manner as shown in FIG. 8. The valve head 44 is configured with a coupling hole 44A opening upwards configured to be in threaded connection with the coupling segment 42B (shown in FIG. 3). The valve head 44 can be provided in the step S1 or after the step S2.

In an optional embodiment of the step S2 of connecting the elastic driving structure 40 to the valve housing 50, as shown in FIG. 9, the valve housing 50 is firstly assembled from the valve inner shell 51 and the valve outer shell 52, the valve housing 50 provides a working chamber of the elastic member 43 and also provides an activity space of the valve diaphragm 30, the elastic working chamber at the upper part is in communication with the activity space at the lower part. The valve inner shell 51 may be provided with two O-rings in advance above and below the leakage detection holes 53, and then inserted into the valve outer shell 52. As shown in FIG. 10, the valve stem 42 provided with the elastic member 43 in advance is mounted in the valve housing 50. With reference to FIG. 2, the collar 42A of the valve stem 42 has flat cut edges at two sides, which are respectively fitted with the protruded limit stops of the valve inner shell 51. When the valve inner shell 51 does not rotate, the valve stem 42 cannot rotate either, so as to facilitate the subsequent assembly. As shown in FIG. 11, step S2 further includes: screwing an external thread of the valve housing 50 to an internal thread of the screw cap 41 of the elastic driving structure 40; however, the screwing operation of the screw cap 41 may be performed in any one of the steps S1 to S4.

In an optional embodiment of the step S3 of mounting the valve diaphragm 30 and the elastic driving structure 40, as shown in FIGS. 12 and 13, the step S3 includes: connecting a joint hole 31B of the valve diaphragm 30 with a joint portion 44B of the valve head 44 of the elastic driving structure 40. In an optional embodiment, the step S3 is performed in the step S4, in which the valve diaphragm 30 is placed on the valve seat 10 in advance, the fixed diaphragm ring 32 of the valve diaphragm 30 is snapped in the fixing groove 16 of the valve seat 10 in advance, and after the valve body 20 is disposed on the valve seat 10 in alignment, the joint portion 44B of the valve head 44 is screwed into the joint hole 31B of the valve diaphragm 30 by rotating the valve stem 42. As shown in FIG. 13, the lifting diaphragm core 31 can be better connected with the valve head 44 by means of the annular knife-edge 13 (or the inner pipe edge of the first fluid passage 11 facing upwards).

In an optional embodiment of the step S4 of disposing the valve housing 50 on the valve seat 10, as shown in FIG. 14, the step S4 includes: erecting a plurality of mounting posts 61, such that they extend vertically through corners of the valve housing 50, through the valve seat 10 and are fixed on a valve bottom plate 62 below the valve seat 10. In the step of disposing the valve housing 50 on the valve seat 10, the fixed diaphragm ring 32 of the valve diaphragm 30 can be fixed at the same time. An upper mounting hole of the mounting post 61 and a lower mounting hole of the valve bottom plate 62 may be filled with anti-corrosion plugs.

In an optional embodiment, there is an axially compressible elastic connection between the screw cap 41 and the valve stem 42, so that when the valve body 20 is closed, the lifting diaphragm core 31 of the valve diaphragm 30 keeps elastically pressing the inner pipe edge (in particular the annular knife-edge 13) of the valve seat 10 between the central fluid passage port 11A and the surrounding fluid passage port 12A, unlike the conventional principle, by which the valve is closed by screwing. The diaphragm switch valve according to the present disclosure has the appearance of a conventional valve, by which the valve is closed by screwing, and actually is elastically closed in the axial direction of the valve. On the other hand, when the valve body 20 is opened, the lifting diaphragm core 31 of the valve diaphragm 30 maintains an upwardly collapsible elastic force. Based on the collapsible elastic driving by the elastic member 43, the opening degree of the diaphragm switch valve is not constant but is dependent on the pressure difference between a higher fluid pressure flowing into the fluid passage and a lower fluid pressure flowing out of the fluid passage. With reference to FIG. 6, the greater the pressure difference between the two, the greater the opening degree of the diaphragm switch valve is, so that when the valve is opened, the outflow rate is higher when high-pressure fluid inflows, which is consistent with the characteristics of the switch valve.

Therefore, it can be confirmed that the diaphragm switch valve of the present disclosure has one or more of the following effects:

1. In combination with the specific feature combination of the annular knife-edge 13 and the elastic member 43, sealing of two or more internal fluid passages and zero leakage of the medicament are achieved, to ensure the application requirements of the corrosive chemicals in semiconductor.
2. In combination with the anti-stretching design of the valve diaphragm 30 and the feature that the force on the lifting diaphragm core 31 due to the connection and disconnection of fluid flow is concentric with the central axis of valve 21, the operation life of the diaphragm switch valve is ensured or extended.
3. The integral structure has the effect of easy assembling and quick disassembling to prevent liquid leakage, the valve diaphragm 30 does not need to be welded or non-detachably connected, such that the assembly is easily replaced and refurbished.
4. Based on the combination of the surrounding fluid passage port 12A of the second fluid passage 12 and the diverging conical depression 31A of the lifting diaphragm core 31, no vortex will be generated when the fluid passes through the valve diaphragm 30, so that the flux and flow velocity are more stable, which effectively ensures the requirements for high stability of the fluid in the semiconductor industry.
5. The medicament flows through the first fluid passage 11 and the second fluid passage 12 without stagnant dead zones, which effectively fulfills the requirements for the transportation of electronic ultrapure water in the semiconductor industry, there is no dead zone, and there is no stagnant dead water in which bacteria grows and pollution is formed.

The present embodiments are to be considered as exemplary embodiments for the purpose of facilitating the understanding and practice of the technical solutions of the present disclosure, and are not intended to limit the scope of protection of the present disclosure. Any equivalent changes made according to the structure, shape and principle of the present disclosure are to be embraced within the scope of protection of the present disclosure.

LIST OF REFERENCE NUMERALS 10 valve seat
11 first fluid passage
11A central fluid passage port 12 second fluid passage
12A surrounding fluid passage port
13 annular knife-edge
14 first pipe joint
15 second pipe joint
16 fixing groove
20 valve body
21 central axis of valve
30 valve diaphragm
31 lifting diaphragm core
31A diverging conical depression
31B joint hole
32 fixed diaphragm ring
33 diaphragm flexure
40 elastic driving structure
41 screw cap
41A internal thread
41B stem accommodation hole
42 valve stem
42A collar
42B coupling segment
42C hole for adjusting stem
43 elastic member
44 valve head
44A coupling hole
44B joint portion
45 retention ring
46 wearing ring
47 gasket
50 valve housing
51 valve inner shell
52 valve outer shell
52A external thread
53 leakage detection hole
55 gas hole
61 mounting post
62 valve bottom plate
63 first pipe sleeve
64 second pipe sleeve

What is claimed is:

1. A diaphragm switch valve, comprising:
a valve seat configured with a first fluid passage and a second fluid passage transverse to a liquid inlet and a liquid outlet, and
a valve body arranged on the valve seat, the valve body comprises a valve diaphragm, an elastic driving structure configured for driving the valve diaphragm to ascend and descend along a central axis of valve to open and close the diaphragm switch valve, and a valve housing configured to provide an accommodation space for the valve diaphragm to ascend and configured to be connected to the elastic driving structure, the valve diaphragm is configured to disconnect the first fluid passage and the second fluid passage,
wherein the valve diaphragm has a lifting diaphragm core concentric with the central axis of valve, a fixed diaphragm ring, and a diaphragm flexure configured for flexibly connecting the lifting diaphragm core and the fixed diaphragm ring,
wherein the first fluid passage is bent upward in the valve seat to form a central fluid passage port, the central fluid passage port extends concentrically with the central axis of valve, the central fluid passage port is directed to the lifting diaphragm core, the second fluid passage forms a surrounding fluid passage port surrounding the central fluid passage port, and the surrounding fluid passage port is directed to the diaphragm flexure,
wherein an inner pipe edge of the valve seat between the central fluid passage port and the surrounding fluid passage port is provided with an annular knife-edge, the annular knife-edge is configured to contact the lifting diaphragm core of the valve diaphragm when the valve body is closed; or the lifting diaphragm core is provided with the annular knife-edge configured to contact the inner pipe edge of the valve seat between the central fluid passage port and the surrounding fluid passage port when the valve body is closed,
when the valve body is closed, a pressure center point of the lifting diaphragm core is located on the central axis of valve, and
wherein a radial length of the diaphragm flexure is greater than a radial distance between the lifting diaphragm core and the fixed diaphragm ring, and a radial length of the diaphragm flexure on one side of the diaphragm flexure is 60-80% of a diameter of the central fluid passage port.

2. The diaphragm switch valve according to claim 1, wherein the lifting diaphragm core of the valve diaphragm has a diverging conical depression aligned with the central axis of valve, and a diameter of the diverging conical depression is smaller than a diameter of the central fluid passage port.

3. An assembly method for a diaphragm switch valve, wherein the assembly method for a diaphragm switch valve is configured for manufacturing the diaphragm switch valve according to claim 1, the assembly method for a diaphragm switch valve comprises:
providing the elastic driving structure of the valve body,
connecting the elastic driving structure to the valve housing,
mounting the valve diaphragm and the elastic driving structure, to constitute the valve body, and
disposing the valve housing on the valve seat, and fixing the fixed diaphragm ring of the valve diaphragm while disposing the valve housing on the valve seat, the valve diaphragm is subjected to an elastic force of the elastic driving structure in a position relative to the valve housing, so as to close the central fluid passage port,
wherein in providing the elastic driving structure of the valve body, the elastic driving structure comprises a screw cap, a valve stem, an elastic member and a valve head, the screw cap is screwed to an outer sidewall of the valve housing and located on the valve housing, the valve stem is telescopically provided under the screw cap and is located in the valve housing concentrically with the central axis of valve, the elastic member is sheathed on a stem body of the valve stem, to provide a second elastic force to the valve stem to push out the valve relative to the screw cap, and the valve head is fixed at one end of the valve stem departing from the screw cap,
connecting the elastic driving structure to the valve housing comprises: screwing an external thread of the valve housing to an internal thread of the screw cap of the elastic driving structure,
disposing the valve housing on the valve seat comprises: connecting a central joint hole of the valve diaphragm with a central joint portion of the valve head of the elastic driving structure,
disposing the valve housing on the valve seat comprises: erecting a plurality of mounting posts, such that the plurality of mounting posts extend vertically through corners of the valve housing, through the valve seat and are fixed on a valve bottom plate below the valve seat, wherein there is an axially compressible elastic connection between the screw cap and the valve stem, so that when the valve body is closed, the lifting diaphragm core of the valve diaphragm elastically presses the inner pipe edge of the valve seat between the central fluid passage port and the surrounding fluid passage port.

4. The diaphragm switch valve according to claim 1, wherein the first fluid passage is a liquid inlet passage configured to apply an upward pressure to the lifting diaphragm core along the central axis of valve, the second fluid passage is a liquid outlet passage configured to apply a downward suction to the lifting diaphragm core along the central axis of valve; and when the valve body is closed, an elastic closing force provided by the elastic driving structure is greater than a difference of the upward pressure minus the downward suction.

5. The diaphragm switch valve according to claim 4, wherein an active face of the annular knife-edge faces the surrounding fluid passage port.

6. The diaphragm switch valve according to claim 1, wherein the valve housing is configured with leakage detection holes in communication with each other, and the leakage detection holes are in communication with a chamber of the valve housing for accommodating the valve diaphragm when the valve diaphragm ascends.

7. The diaphragm switch valve according to claim 6, wherein the valve housing comprises a valve inner shell and a valve outer shell, the valve inner shell has a second accommodation space for the valve diaphragm, the valve outer shell is fixed on the valve seat, the valve seat is further provided with a fixing groove configured for limit movement of the fixed diaphragm ring, and when the valve outer shell is fixed on the valve seat, a circumferential edge of the valve inner shell limits movement of the fixed diaphragm ring in the fixing groove, to prevent the fixed diaphragm ring from coming out of the fixing groove.

8. The diaphragm switch valve according to claim 7, wherein the leakage detection holes penetrate one side of the valve inner shell and the valve outer shell, so that a liquid leaks on a side away from the elastic driving structure through the leakage detection holes when the liquid is leaking.

9. The diaphragm switch valve according to claim 1, wherein the elastic driving structure comprises:

a screw cap adjustably disposed on an outer sidewall of the valve housing, a valve stem telescopically provided below the screw cap, the valve stem is concentrically arranged in the valve housing with the central axis of valve, an elastic member, the elastic member is sheathed on a stem body of the valve stem, to provide an elastic force to the valve stem, to push out the valve stem with respect to the screw cap, and a valve head fixed at one end of the valve stem departing from the screw cap, the valve diaphragm is fixed on the valve head, wherein when the screw cap rises and sinks relative to the valve housing by rotation of the screw cap, the valve stem, the elastic member and the valve head do not rotate relative to each other, and the elastic member provides an elastic closing force to the valve diaphragm.

10. The diaphragm switch valve according to claim 9, wherein the stem body of the valve stem is provided with a collar configured to be pushed by a first end of the elastic member, the stem body of the valve stem is sheathed with a retention ring, movement of the retention ring is limited in the screw cap, and the retention ring is pushed by a second end of the elastic member to ascend and descend along with the screw cap.

11. The diaphragm switch valve according to claim 10, wherein the screw cap is configured such that a height of the screw cap relative to the valve housing is adjusted in a rotational manner, the screw cap is configured with a stem accommodation hole concentric with the central axis of valve, wherein when the height of the screw cap relative to the valve housing is configured to be reduced until the lifting diaphragm core elastically closes the central fluid passage port, a second end of the valve stem is retracted into the stem accommodation hole, wherein when the height of the screw cap relative to the valve housing is increased until the lifting diaphragm core does not elastically close the central fluid passage port, the collar is located in first position, wherein an opening degree of the lifting diaphragm core is determined by a position where an upward pressure is equal to a sum of a downward suction due to outflow of fluid and the elastic force of the elastic member under a compressed length and a weight of moving components for opening and closing the diaphragm switch valve, and wherein the moving components for opening and closing the diaphragm switch valve comprise the valve stem, the valve head and the lifting diaphragm core of the valve diaphragm.

* * * * *